US012802965B2

(12) United States Patent
Lee et al.

(10) Patent No.: US 12,802,965 B2
(45) Date of Patent: Nov. 17, 2026

(54) METHOD FOR MANUFACTURING NEGATIVE ELECTRODE COMPRISING UPPER LAYER AND LOWER LAYER

(71) Applicant: LG Energy Solution, Ltd., Seoul (KR)

(72) Inventors: Taek-Soo Lee, Daejeon (KR); Young-Gon Kim, Daejeon (KR); Shin-Wook Jeon, Daejeon (KR); Sang-Hoon Choy, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 688 days.

(21) Appl. No.: 18/029,643

(22) PCT Filed: Dec. 3, 2021

(86) PCT No.: PCT/KR2021/018294
§ 371 (c)(1),
(2) Date: Mar. 30, 2023

(87) PCT Pub. No.: WO2022/119408
PCT Pub. Date: Jun. 9, 2022

(65) Prior Publication Data

US 2023/0378424 A1 Nov. 23, 2023

(30) Foreign Application Priority Data

Dec. 3, 2020 (KR) ........................ 10-2020-0167824

(51) Int. Cl.

| | |
|---|---|
| ***H01M 4/04*** | (2006.01) |
| ***H01M 4/36*** | (2006.01) |
| ***H01M 4/583*** | (2010.01) |
| ***H01M 4/62*** | (2006.01) |
| *H01M 4/02* | (2006.01) |
| *H01M 10/052* | (2010.01) |

(52) U.S. Cl.
CPC ....... *H01M 4/0471* (2013.01); *H01M 4/0404* (2013.01); *H01M 4/366* (2013.01); *H01M 4/583* (2013.01); *H01M 4/622* (2013.01); *H01M 2004/027* (2013.01); *H01M 10/052* (2013.01)

(58) Field of Classification Search
CPC ............. H01M 4/0471; H01M 4/0404; H01M 4/366583; H01M 4/622; H01M 10/052
See application file for complete search history.

(56) References Cited

U.S. PATENT DOCUMENTS

| | | | | |
|---|---|---|---|---|
| 2014/0287316 A1 | | 9/2014 | Ahn et al. | |
| 2019/0027740 A1 | | 1/2019 | Lee et al. | |
| 2019/0036105 A1 | * | 1/2019 | Park .................... | H01M 4/0404 |
| 2019/0229338 A1 | | 7/2019 | Ho et al. | |
| 2021/0119200 A1 | | 4/2021 | Nam | |

FOREIGN PATENT DOCUMENTS

| | | | | | |
|---|---|---|---|---|---|
| CN | 110335989 A | * | 10/2019 | ........ | H01M 10/0525 |
| CN | 110335989 B | | 9/2020 | | |
| JP | 2014-107182 A | | 6/2014 | | |
| JP | 2015-153658 A | | 8/2015 | | |
| KR | 10-2015-0087864 A | | 7/2015 | | |
| KR | 10-1560471 B1 | | 10/2015 | | |
| KR | 10-2018-0040268 A | | 4/2018 | | |
| KR | 10-2019-0029320 A | | 3/2019 | | |
| KR | 10- 2019-0060719 A | | 6/2019 | | |
| KR | 10-2019-0061013 A | | 6/2019 | | |
| KR | 10-2019-0064480 A | | 6/2019 | | |
| KR | 10-2066704 B1 | | 1/2020 | | |
| KR | 10-2096821 B1 | | 4/2020 | | |

OTHER PUBLICATIONS

International Search Report (with partial translation) and Written Opinion dated Mar. 23, 2022, for corresponding International Patent Application No. PCT/KR2021/018294.

The extended European Search Report (EESR) dated Nov. 13, 2024, issued in corresponding European Patent Application No. 21901096.4.

Office Action dated Apr. 9, 2026 issued in the corresponding Chinese Patent Application No. 202180067182.2.

* cited by examiner

*Primary Examiner* — Jimmy Vo
(74) *Attorney, Agent, or Firm* — Morgan, Lewis & Bockius LLP

(57) ABSTRACT

Disclosed is a method for manufacturing a negative electrode, including the steps of: preparing a slurry for a lower layer containing a first active material, a first binder and a first dispersion medium, and a slurry for an upper layer containing a second active material, a second binder and a second dispersion medium; coating the slurry for a lower layer on one surface of a negative electrode current collector, and coating the slurry for an upper layer on the slurry for a lower layer at the same time or with a predetermined time interval; and drying the coated slurry for a lower layer and slurry for an upper layer at the same time to form an active material layer, wherein A is 103-300 and B is 1.1-3.5 in the following formula:

$$A=B/\text{(drying rate)}$$

B=(wt % of the first binder in the solid content of the slurry for a lower layer)/(wt % of the second binder in the solid content of the slurry for an upper layer)

Drying rate=(total content of the dispersion medium per unit area of the active material layer)/(drying time)(g/(cm$^2$×min)).

7 Claims, No Drawings

METHOD FOR MANUFACTURING NEGATIVE ELECTRODE COMPRISING UPPER LAYER AND LOWER LAYER

TECHNICAL FIELD

The present disclosure relates to a method for manufacturing a negative electrode which shows an improved drying rate and adhesion.

The present application claims priority to Korean Patent Application No. 10-2020-0167824 filed on Dec. 3, 2020 in the Republic of Korea, the disclosures of which are incorporated herein by reference.

BACKGROUND ART

As technical development and needs for mobile instruments have been increased, rechargeable secondary batteries that can be downsized and provided with high capacity have been increasingly in demand. In addition, among such secondary batteries, lithium secondary batteries having high energy density and operating voltage have been commercialized and used widely.

A lithium secondary battery has a structure including an electrode assembly having a positive electrode and a negative electrode, each of which includes an active material coated on an electrode current collector, and a porous separator interposed between both electrodes; and a lithium salt-containing electrolyte injected to the electrode assembly. The electrode is obtained by applying a slurry including an active material, a binder and a conductive material dispersed in a solvent to a current collector, followed by drying and pressing.

Previously, the production of lithium secondary batteries was small. Recently, there is an increasing need for mass production, as secondary batteries are increasingly in demand recently.

Expansion of the production line for mass production requires high cost, and the production process should be accelerated in order to enable mass production through consumption investment.

In a system for manufacturing an electrode for a secondary battery, a coating device requires the highest cost. Therefore, provision of several coating devices requires high investment costs, resulting in degradation of price competitiveness.

There have been several attempts to enhance the drying processing rate. However, when the drying rate is increased, there is a problem in that a binder is distributed more abundantly on the surface of an electrode active material layer to cause degradation of the adhesion between the active material layer and a current collector. In this case, when the content of binder is increased simply to prevent such degradation of the adhesion, the resultant secondary battery shows increased resistance undesirably.

DISCLOSURE

Technical Problem

The present disclosure is designed to solve the problems of the related art, and therefore the present disclosure is directed to providing a method for manufacturing a negative electrode which provides increased adhesion between an active material layer and a current collector, while not significantly increasing the content of a binder, and shows an increased processing rate.

The present disclosure is also directed to providing a negative electrode obtained by the method for manufacturing a negative electrode, and a lithium secondary battery including the same.

Technical Solution

In one aspect of the present disclosure, there is provided a method for manufacturing a negative electrode according to any one of the following embodiments.

According to the first embodiment, there is provided a method for manufacturing a negative electrode, including the steps of:

preparing a slurry for a lower layer containing a first active material, a first binder and a first dispersion medium, and a slurry for an upper layer containing a second active material, a second binder and a second dispersion medium;

coating the slurry for a lower layer on one surface of a negative electrode current collector, and coating the slurry for an upper layer on the slurry for a lower layer at the same time or with a predetermined time interval; and drying the coated slurry for a lower layer and slurry for an upper layer at the same time to form an active material layer, wherein A is 103-300 and B is 1.1-3.5 in the following formula:

$$A=B/(\text{drying rate}),$$

B=(wt % of the first binder in the solid content of the slurry for a lower layer)/(wt % of the second binder in the solid content of the slurry for an upper layer), Drying rate=(total content of the dispersion medium per unit area of the active material layer)/(drying time) (g/(cm$^2$× min)).

According to the second embodiment, there is provided the method for manufacturing a negative electrode as defined in the first embodiment, wherein A is 103-295.

According to the third embodiment, there is provided the method for manufacturing a negative electrode as defined in the first or the second embodiment, wherein B is 1.1-3.4.

According to the fourth embodiment, there is provided the method for manufacturing a negative electrode as defined in any one of the first to the third embodiments, wherein the ratio of thickness of the upper region derived from the slurry for an upper layer to that of the lower region derived from the slurry for a lower layer is 1:1.04-1:9.

According to the fifth embodiment, there is provided the method for manufacturing a negative electrode as defined in any one of the first to the fourth embodiments, wherein each of the first active material and the second active material independently includes artificial graphite, natural graphite, hard carbon, soft carbon, graphitized carbon fibers, graphitized mesocarbon microbeads, petroleum cokes, baked resin, carbon fibers, pyrolyzed carbon, Si, silicon oxide represented by $SiO_x$ ($0<x\leq2$), lithium titanium oxide (LTO), lithium metal, or two or more of them.

According to the sixth embodiment, there is provided the method for manufacturing a negative electrode as defined in any one of the first to the fifth embodiments, wherein the slurry for a lower layer is coated on one surface of the negative electrode current collector, and the slurry for an upper layer is coated on the slurry for a lower layer at the same time or with a time interval of 0.6 sec or less.

According to the seventh embodiment, there is provided the method for manufacturing a negative electrode as defined in any one of the first to the sixth embodiments, wherein each of the first binder and the second binder independently includes polyvinylidene fluoride-co-hexafluoropropylene (PVDF-co-HFP), polyvinylidene fluoride, polyacrylonitrile, polymethyl methacrylate, polyacrylic acid, polymethacrylic acid, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, styrene butadiene rubber (SBR), fluoro-rubber, or two or more of them.

According to the eighth embodiment, there is provided the method for manufacturing a negative electrode as defined in any one of the first to the seventh embodiments, wherein each of the first binder and the second binder includes styrene butadiene rubber (SBR) and carboxymethyl cellulose (CMC).

According to the ninth embodiment, there is provided a negative electrode obtained from the method for manufacturing a negative electrode as defined in any one of the first to the eighth embodiments.

According to the tenth embodiment, there is provided a lithium secondary battery including the negative electrode as defined in the ninth embodiment.

Advantageous Effects

According to an embodiment of the present disclosure, in a negative electrode having a bilayer structure of an upper layer and a lower layer, the drying rate for a slurry for forming a negative electrode active material layer is controlled depending on the ratio (B) of the binder content of the lower region to the binder content of the upper region. In this manner, migration of the binder toward the surface of the negative electrode active material layer is inhibited, when A (i.e. B/drying rate) satisfies a range of 103-300. As a result, it is possible to provide a negative electrode showing increased adhesion between an active material layer and a current collector and realizing uniform distribution of the binder in the active material layer, even though the binder content in the negative electrode active material layer is not increased significantly or a smaller content of binder is used, as compared to the binder content in the active material layer of a conventional single-layer negative electrode. In addition, since the interfacial adhesion between the current collector and the negative electrode active material layer is improved and the separation of the active material is prevented in the negative electrode according to an embodiment of the present disclosure as mentioned above, the secondary battery using the negative electrode can realize excellent resistance characteristics.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a method for manufacturing a negative electrode, including the steps of:

preparing a slurry for a lower layer containing a first active material, a first binder and a first dispersion medium, and a slurry for an upper layer containing a second active material, a second binder and a second dispersion medium;

coating the slurry for a lower layer on one surface of a negative electrode current collector, and coating the slurry for an upper layer on the slurry for a lower layer at the same time or with a predetermined time interval; and drying the coated slurry for a lower layer and slurry for an upper layer at the same time to form an active material layer, wherein A is 103-300 and B is 1.1-3.5 in the following formula:

$$A=B/(\text{drying rate}),$$

B=(wt % of the first binder in the solid content of the slurry for a lower layer)/(wt % of the second binder in the solid content of the slurry for an upper layer), Drying rate=(total content of the dispersion medium per unit area of the active material layer)/(drying time) ($g/(cm^2\times min)$).

According to the related art, in order to improve the efficiency of a process for manufacturing an electrode, there was an attempt to increase the drying rate in a drying step requiring the longest time among the steps for manufacturing an electrode. However, when the drying rate is increased, the dispersion medium in the coated slurry migrates rapidly toward the upper surface of the coating layer, and an excessive amount of binder also migrates toward the surface portion together with the dispersion medium (also functioning as a solvent for the binder). As a result, the binder is distributed more abundantly on the surface of the electrode active material layer, resulting in degradation of the adhesion between the active material layer and the current collector undesirably. When the content of the binder is increased in order to prevent such degradation of the adhesion, a side effect occurs to increase the resistance of a secondary battery.

According to the present disclosure, A is defined as a value calculated by dividing B, i.e. (wt % of the binder in the solid content of the slurry for a lower layer)/(wt % of the binder in the solid content of the slurry for an upper layer), by a drying rate.

In other words, when the electrode layer is dried, binder migration occurs inevitably, and it is known that the degree of binder migration is in proportion to the drying rate of the slurry for forming the electrode layer, wherein the proportion is close to exponential proportion rather than linear proportion. Therefore, A is a parameter indicating how much the binder content in the lower region is controlled to be higher than the binder content of the upper region in order to improve the interfacial adhesion between the current collector and the electrode active material layer and to realize uniform adhesion in the active material layer through the uniform distribution of the binder in the active material layer, even though binder migration occurs more as the drying rate is increased.

A may be 103-300, particularly 103-295, 103-292, 110-292, 110-179, or 179-292.

When A satisfies the above-defined range, it is possible to provide a negative electrode which shows improved interfacial adhesion between the current collector and the electrode active material layer and realizes uniform distribution of the binder in the active material layer, even though the binder content in the negative electrode active material layer is not increased significantly or a smaller content of binder is used, as compared to the binder content in the active material layer of a conventional single-layer negative electrode. When the negative electrode shows improved interfacial adhesion between the current collector and the negative electrode active material layer and is prevented from the separation of the active material, the secondary battery using the negative electrode can realize excellent resistance characteristics.

In addition, B, i.e. (wt % of the binder in the solid content of the slurry for a lower layer)/(wt % of the binder in the solid content of the slurry for an upper layer), may be 1.1-3.5. According to an embodiment of the present disclosure, B may be 1.1-3.4, 1.33-3.4, 1.53-3.4, 2.6-3.4, or 1.53-2.6.

When B satisfies the above-defined range, it is possible to provide a negative electrode which shows improved interfacial adhesion between the current collector and the electrode active material layer and realizes uniform distribution of the binder in the active material layer, even though the binder content in the negative electrode active material layer is not increased significantly or a smaller content of binder is used, as compared to the binder content in the active material layer of a conventional single-layer negative electrode.

According to an embodiment of the present disclosure, any negative electrode active material may be used as the active material of the active material layer, as long as it is one used conventionally. For example, the active material may include a carbonaceous active material, silicon-based active material, or the like. Particular examples of the active material include, but are not limited to: artificial graphite, natural graphite, hard carbon, soft carbon, graphitized carbon fibers, graphitized mesocarbon microbeads, petroleum cokes, baked resin, carbon fibers, pyrolyzed carbon, Si, silicon oxide represented by $SiO_x$ ($0<x\leq 2$), lithium titanium oxide (LTO), lithium metal, or two or more of them.

Herein, in general, artificial graphite may be prepared through carbonization of raw materials, such as coal tar, coal tar pitch and petroleum-based heavy oil, at a temperature of 2,500 °C or higher. After such graphitization, the resultant product is subjected to particle size adjustment, such as pulverization and secondary particle formation, so that it may be used as a negative electrode active material. In the case of artificial graphite, it includes crystals distributed randomly in particles and has a lower sphericity as compared to natural graphite and a slightly sharp shape.

The artificial graphite used according to an embodiment of the present disclosure includes commercially available mesophase carbon microbeads (MCMB), mesophase pitch-based carbon fibers (MPCF), block-like graphitized artificial graphite, powder-like graphitized artificial graphite, or the like, and may be artificial graphite having a sphericity of 0.91 or less, preferably 0.6-0.91, and more preferably 0.7-0.9.

The artificial graphite may have a particle diameter of 5-30 μm, preferably 10-25 μm.

In general, natural graphite is in the form of a sheet-like aggregate before processing, and sheet-like particles are formed into spherical shapes having smooth surfaces through a post-treatment process, such as particle pulverization and reassemblage, so that they may be used as active materials for manufacturing an electrode.

The natural graphite used according to an embodiment of the present disclosure may have a sphericity of larger than 0.91 and equal to or less than 0.97, preferably 0.93-0.97, and more preferably 0.94-0.96.

The natural graphite may have a particle diameter of 5-30 μm, preferably 10-25 μm.

The active material layer may include two or more types of active materials. In this case, different types of active materials may be distributed from the vicinity of the current collector of the active material layer toward the surface, or two or more active materials which are homogeneous but are different in terms of average particle diameter or shape may be present. Further, two or more different types of active materials having different in shape or average particle diameter may be included in the active material layer.

For example, the active material layer may include natural graphite alone or a mixture of natural graphite with artificial graphite, in the lower region near the current collector, and may include artificial graphite alone or a mixture of natural graphite with artificial graphite, or an active material having a different type or combination from the lower region, in the upper region near the surface. In addition, even when the active material layer includes a homogeneous active material (e.g. a mixture of natural graphite with artificial graphite), the lower region may include an active material having a smaller average particle diameter, and the upper region may include an active material having a larger average particle diameter.

When the lower region and the upper region of the active material layer include different types of active materials or active materials different in average particle diameter or shape as mentioned above, an intermixing region may be present at the portion where the lower region is in contact with the upper region, wherein different types of active materials exist in combination in the intermixing region.

According to an embodiment of the present disclosure, when the upper region of the active material layer includes a mixture of artificial graphite with natural graphite, the weight ratio of artificial graphite to natural graphite may be 9.99:0.01-0.01:9.99, particularly 9.7:0.3-7:3. When the above-defined weight ratio is satisfied, it is possible to realize a higher output.

In addition, when the lower region of the active material layer includes a mixture of artificial graphite with natural graphite, the weight ratio of artificial graphite to natural graphite may be 9.99:0.01-0.01:9.99, particularly 9.5:0.5-6:4. When the above-defined weight ratio is satisfied, it is possible to realize a higher output even at the same content of conductive material.

According to an embodiment of the present disclosure, the total thickness of the negative electrode active material layer is not particularly limited. For example, the negative electrode active material layer may have a total thickness of 40-300 μm. In addition, when the active material layer has an upper region and a lower region, each of the upper region and the lower region may have a thickness of 8-240 μm.

According to an embodiment of the present disclosure, the ratio of thickness of the upper region derived from the slurry for an upper layer to that of the lower region derived from the slurry fora lower layer may be 1:1.04-1:9, or 1:1.66-1:8.96.

Herein, when the ratio of thickness of the upper region to that of the lower region satisfies the above-defined range, it is possible to provide a negative electrode which shows increased binding force between the active material layer and the current collector, while not significantly increasing the binder content, is prevented from separation of the active material, and has improved resistance characteristics.

According to an embodiment of the present disclosure, the negative electrode current collector used as a substrate for forming the active material layer is not particularly limited, as long as it has conductivity, while not causing any chemical change in the corresponding battery. For example, copper, stainless steel, aluminum, nickel, titanium, baked carbon, copper or stainless steel surface-treated with carbon, nickel, titanium, silver, etc., aluminum-cadmium alloy, or the like, may be used.

Although the current collector is not particularly limited in its thickness, it may have a currently used thickness of 3-500 μm.

According to an embodiment of the present disclosure, the slurry for a lower layer is coated, and the slurry for an upper layer is coated on the slurry for a lower layer at the same time or with a predetermined time interval. According to an embodiment of the present disclosure, the time interval may be 0.6 sec or less, 0.02-0.6 sec, 0.02-0.06 sec, or 0.02-0.03 sec. The time interval between the coating of the slurry for a lower layer and the coating of the slurry for an upper layer is generated due to a coating system, and it is preferred that the slurry for a lower layer and the slurry for an upper layer are coated at the same time. The slurry for an upper layer may be coated on the slurry for a lower layer by using a device, such as a double slot die.

Each of the first binder and the second binder may independently include polyvinylidene fluoride-co-hexafluoropropylene (PVDF-co-HFP), polyvinylidene fluoride, polyacrylonitrile, polymethyl methacrylate, polyacrylic acid, polymethacrylic acid, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, styrene butadiene rubber (SBR), fluoro-rubber, or two or more of them. Herein, each of the first binder and the second binder may use a single type of polymer or two or more types of polymers.

According to an embodiment of the present disclosure, each of the first binder and the second binder may include styrene butadiene rubber (SBR) in combination with carboxymethyl cellulose (CMC).

In the first binder and the second binder, the polymer functioning to contribute to stabilization of slurry dispersion by increasing the viscosity of the slurry may also be referred to as a thickener.

In the first binder and the second binder, the polymer functioning as such a thickener may include carboxymethyl cellulose, starch, polyacrylic acid, polymethacrylic acid, polyvinyl alcohol, or the like.

Such thickeners may be classified into those (e.g. polyacrylic acid, polymethacrylic acid and polyvinyl alcohol) functioning not only as a binder in the active material layer but also as a thickener for stabilizing slurry dispersion, when being used alone, and those (e.g. carboxymethyl cellulose and starch) used in combination with another binder and mostly contributing to stabilization of slurry dispersion.

The method for differentiating a thickener contributing to stabilization of slurry dispersion among the thickeners includes preparing a solution by dissolving each of multiple binders in a solvent at the same content, and determining the binder used for a solution having a relatively higher viscosity as a binder also functioning as a thickener, as compared to the binder used for a solution having a relatively lower viscosity.

In a variant, when preparing a solution of a dispersion medium and binder used for slurry at the same concentration as the slurry, and the solution shows a viscosity increased above a predetermined viscosity value, the binder may be classified as a binder also functioning as a thickener.

The solvent that may be used includes acetone, water, or the like.

Each of the slurry for a lower layer and slurry for an upper layer may further include a conductive material. The conductive material is not particularly limited, as long as it causes no chemical change in the corresponding battery and has conductivity. Particular examples of the conductive material include: carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; conductive materials, such as polyphenylene derivatives, or the like.

The step of forming an active material layer may further include a step of pressing the active material layer after the drying step. Herein, the pressing may be carried out by using a method, such as roll pressing, used conventionally in the art. For example, the pressing may be carried out under a pressure of 1-20 MPa at a temperature of 15-30 °C In another aspect of the resent disclosure, there is provided a lithium secondary battery including the negative electrode obtained as described above. Particularly, the lithium secondary battery may be obtained by injecting a lithium salt-containing electrolyte to an electrode assembly including a positive electrode, the negative electrode as described above and a separator interposed between both electrodes.

The positive electrode may be obtained by mixing a positive electrode active material, a conductive material, a binder and a solvent to form a slurry, and coating the slurry directly onto a metal current collector, or casting the slurry onto a separate support, peeling a positive electrode active material film from the support and laminating the film on a metal current collector.

The positive electrode active material used in the positive electrode active material layer may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x < 0.5$, $0 \leq y < 0.5$, $0 \leq z < 0.5$, and $0 < x+y+z \leq 1$), or a mixture of at least two of them.

Meanwhile, the same conductive material, binder and solvent as used for manufacturing the negative electrode may be used.

The separator may be a conventional porous polymer film used conventionally as a separator. For example, the porous polymer film may be a porous polymer film made of a polyolefininc polymer, such as ethylene homopolymer, propylene homopolymer, ethylene/butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonate is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, a cylindrical battery casing or a prismatic battery casing, and then injecting the electrolyte thereto. In a variant, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or a cable type battery.

The lithium secondary battery according to the present disclosure may be used for a battery cell used as a power source for a compact device, and may be used preferably as a unit battery for a medium- or large-size battery module including a plurality of battery cells. Particular examples of medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1: Manufacture of Negative Electrode and Lithium Secondary Battery

<Manufacture of Negative Electrode>

First, a negative electrode active material including 9.45 parts by weight of natural graphite having an average sphericity of 0.95 and 85.05 parts by weight of artificial graphite having an average sphericity of 0.9, a conductive material including 1.5 parts by weight of carbon black, a first binder including 3 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.55 parts by weight of natural graphite having an average sphericity of 0.95 and 85.95 parts by weight of artificial graphite having an average sphericity of 0.9, a conductive material including 1.5 parts by weight of carbon black, a second binder including 2 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, the slurry for a lower layer was coated on one surface of copper (Cu) foil (thickness: 10 μm) as a negative electrode current collector, and the slurry for an upper layer was coated on the slurry for a lower layer at the same time, by using a double slot die.

After that, the coated slurry for a lower layer and slurry for an upper layer were dried at the same time by using a drying system provided with a hot air oven to form an active material layer. Herein, the drying chamber of the drying system has ten drying zones from the first drying zone, where the slurry-coated current collector is introduced to the drying system for the first time, to the tenth drying zone. The formed upper layer and lower layer active material layers are pressed by roll pressing at the same time to obtain a negative electrode provided with an active material layer having a bilayer structure of upper layer/lower layer.

The content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate are shown in the following Table 1. In addition, the hot air temperature condition of each of the first drying zone to the tenth drying zone of the drying system is shown in the following Table 2.

<Manufacture of Positive Electrode>

$Li(Ni_{0.6}Mn_{0.2}Co_{0.2})O_2$ (NCM-622) as a positive electrode active material, carbon black as a conductive material and polyvinylidene fluoride (PVDF) as a binder were added to N-methyl pyrrolidone (NMP) as a solvent at a weight ratio of 96:2:2 to prepare a positive electrode active material slurry. The slurry was coated on one surface of an aluminum current collector having a thickness of 15 μm, and then dried and pressed under the same conditions as the negative electrode to obtain a positive electrode. Herein, the loading amount of the positive electrode active material layer was 28.1 $g/cm^2$ on the dry weight basis.

<Manufacture of Lithium Secondary Battery>

A non-aqueous electrolyte was prepared by dissolving $LiPF_6$ in an organic solvent containing ethylene carbonate (EC), dimethyl carbonate (DMC) and diethyl carbonate (DEC) mixed at a volume ratio of 1:2:1 to a concentration of 1.0 M.

Then, a polyolefin separator was interposed between the positive electrode and the negative electrode obtained as described above, the resultant structure was received in a pouch cell, and the electrolyte was injected thereto to obtain a lithium secondary battery.

Example 2: Manufacture of Negative Electrode and Lithium Secondary Battery

First, a negative electrode active material including 9.45 parts by weight of natural graphite having an average sphericity of 0.95 and 85.05 parts by weight of artificial graphite having an average sphericity of 0.9, a conductive material including 1.5 parts by weight of carbon black, a first binder including 3 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.59 parts by weight of natural graphite having an average sphericity of 0.95 and 86.31 part by weight of artificial graphite having an average sphericity of 0.9, a conductive material including 1.5 parts by weight of carbon black, a second binder including 1.6 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 3: Manufacture of Negative Electrode and Lithium Secondary Battery

First, a negative electrode active material including 9.45 parts by weight of natural graphite having an average sphericity of 0.95 and 85.05 parts by weight of artificial graphite having an average sphericity of 0.9, a conductive material including 1.5 parts by weight of carbon black, a first binder including 3 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.59 parts by weight of natural graphite having an average sphericity of 0.95 and 86.31 part by weight of artificial graphite having an average sphericity of 0.9, a conductive material including 1.5 parts by weight of carbon black, a second binder including 1.6 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 4: Manufacture of Negative Electrode and Lithium Secondary Battery

First, a negative electrode active material including 9.45 parts by weight of natural graphite having an average sphericity of 0.95 and 85.05 parts by weight of artificial graphite having an average sphericity of 0.9, a conductive material including 1.5 parts by weight of carbon black, a first binder including 3 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.59 parts by weight of natural graphite having an average sphericity of 0.95 and 86.31 part by weight of artificial graphite having an average sphericity of 0.9, a conductive material including 1.5 parts by weight of carbon black, a second binder including 1.6 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 5: Manufacture of Negative Electrode and Lithium Secondary Battery

First, a negative electrode active material including 9.45 parts by weight of natural graphite having an average sphericity of 0.95 and 85.05 parts by weight of artificial graphite having an average sphericity of 0.9, a conductive material including 1.5 parts by weight of carbon black, a first binder including 3 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.59 parts by weight of natural graphite having an average sphericity of 0.95 and 86.31 part by weight of artificial graphite having an average sphericity of 0.9, a conductive material including 1.5 parts by weight of carbon black, a second binder including 1.6 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 6: Manufacture of Negative Electrode and Lithium Secondary Battery

First, a negative electrode active material including 9.39 parts by weight of natural graphite having an average sphericity of 0.95 and 84.51 part by weight of artificial graphite having an average sphericity of 0.9, a conductive material including 1.5 parts by weight of carbon black, a first binder including 3.6 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.65 parts by weight of natural graphite having an average sphericity of 0.95 and 86.85 parts by weight of artificial graphite having an average sphericity of 0.9, a conductive material including 1.5 parts by weight of carbon black, a second binder including 1 part by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 7: Manufacture of Negative Electrode and Lithium Secondary Battery

First, a negative electrode active material including 9.39 parts by weight of natural graphite having an average sphericity of 0.95 and 84.51 part by weight of artificial graphite having an average sphericity of 0.9, a conductive material including 1.5 parts by weight of carbon black, a first binder including 3.6 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.65 parts by weight of natural graphite having an average sphericity of 0.95 and 86.85 parts by weight of artificial graphite having an average sphericity of 0.9, a conductive material including 1.5 parts by weight of carbon black, a second binder including 1 part by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 8: Manufacture of Negative Electrode and Lithium Secondary Battery

First, a negative electrode active material including 9.39 parts by weight of natural graphite having an average sphericity of 0.95 and 84.51 part by weight of artificial graphite having an average sphericity of 0.9, a conductive material including 1.5 parts by weight of carbon black, a first binder including 3.6 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.65 parts by weight of natural graphite having an average sphericity of 0.95 and 86.85 parts by weight of artificial graphite having an average sphericity of 0.9, a conductive material including 1.5 parts by weight of carbon black, a second binder including 1 part by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 9: Manufacture of Negative Electrode and Lithium Secondary Battery

First, a negative electrode active material including 9.34 parts by weight of natural graphite having an average sphericity of 0.95 and 84.06 parts by weight of artificial graphite having an average sphericity of 0.9, a conductive material including 1.5 parts by weight of carbon black, a first binder including 4.1 part by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.7 parts by weight of natural graphite having an average sphericity of 0.95 and 87.3 parts by weight of artificial graphite having an average sphericity of 0.9, a conductive material including 1.5 parts by weight of carbon black, a second binder including 0.5 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 10: Manufacture of Negative Electrode and Lithium Secondary Battery

First, a negative electrode active material including 9.34 parts by weight of natural graphite having an average sphericity of 0.95 and 84.06 parts by weight of artificial graphite having an average sphericity of 0.9, a conductive material including 1.5 parts by weight of carbon black, a first binder including 4.1 part by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.7 parts by weight of natural graphite having an average sphericity of 0.95 and 87.3 parts by weight of artificial graphite having an average sphericity of 0.9, a conductive material including 1.5 parts by weight of carbon black, a second binder including 0.5 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 11: Manufacture of Negative Electrode and Lithium Secondary Battery

First, a negative electrode active material including 9.36 parts by weight of natural graphite having an average sphericity of 0.95 and 84.24 parts by weight of artificial graphite having an average sphericity of 0.9, a conductive material including 1.5 parts by weight of carbon black, a first binder including 3.9 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.62 parts by weight of natural graphite having an average sphericity of 0.95 and 86.58 parts by weight of artificial graphite having an average sphericity of 0.9, a conductive material including 1.5 parts by weight of carbon black, a second binder including 1.3 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 12: Manufacture of Negative Electrode and Lithium Secondary Battery

First, a negative electrode active material including 9.36 parts by weight of natural graphite having an average sphericity of 0.95 and 84.24 parts by weight of artificial graphite having an average sphericity of 0.9, a conductive material including 1.5 parts by weight of carbon black, a first binder including 3.9 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.62 parts by weight of natural graphite having an average sphericity of 0.95 and 86.58 parts by weight of artificial graphite having an average sphericity of 0.9, a conductive material including 1.5 parts by weight of carbon black, a second binder including 1.3 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 13: Manufacture of Negative Electrode and Lithium Secondary Battery

First, a negative electrode active material including 9.36 parts by weight of natural graphite having an average sphericity of 0.95 and 84.24 parts by weight of artificial graphite having an average sphericity of 0.9, a conductive material including 1.5 parts by weight of carbon black, a first binder including 3.9 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.62 parts by weight of natural graphite having an average sphericity of 0.95 and 86.58 parts by weight of artificial graphite having an average sphericity of 0.9, a conductive material including 1.5 parts by weight of carbon black, a second binder including 1.3 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 14: Manufacture of Negative Electrode and Lithium Secondary Battery

First, a negative electrode active material including 9.33 parts by weight of natural graphite having an average sphericity of 0.95 and 83.97 parts by weight of artificial graphite having an average sphericity of 0.9, a conductive material including 1.5 parts by weight of carbon black, a first binder including 4.2 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.65 parts by weight of natural graphite having an average sphericity of 0.95 and 86.85 parts by weight of artificial graphite having an average sphericity of 0.9, a conductive material including 1.5 parts by weight of carbon black, a second binder including 1 part by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 15: Manufacture of Negative Electrode and Lithium Secondary Battery

First, a negative electrode active material including 9.33 parts by weight of natural graphite having an average sphericity of 0.95 and 83.97 parts by weight of artificial graphite having an average sphericity of 0.9, a conductive material including 1.5 parts by weight of carbon black, a first binder including 4.2 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.65 parts by weight of natural graphite having an average sphericity of 0.95 and 86.85 parts by weight of artificial graphite having an average sphericity of 0.9, a conductive material including 1.5 parts by weight of carbon black, a second binder including 1 part by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 16: Manufacture of Negative Electrode and Lithium Secondary Battery

First, a negative electrode active material including 9.39 parts by weight of natural graphite having an average sphericity of 0.95 and 84.51 part by weight of artificial graphite having an average sphericity of 0.9, a conductive material including 1.5 parts by weight of carbon black, a first binder including 3.6 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.65 parts by weight of natural graphite having an average sphericity of 0.95 and 86.85 parts by weight of artificial graphite having an average sphericity of 0.9, a conductive material including 1.5 parts by weight of carbon black, a second binder including 1 part by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 17: Manufacture of Negative Electrode and Lithium Secondary Battery

First, a negative electrode active material including 9.39 parts by weight of natural graphite having an average sphericity of 0.95 and 84.51 part by weight of artificial graphite having an average sphericity of 0.9, a conductive material including 1.5 parts by weight of carbon black, a first binder including 3.6 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.65 parts by weight of natural graphite having an average sphericity of 0.95 and 86.85 parts by weight of artificial graphite having an average sphericity of 0.9, a conductive material including 1.5 parts by weight of carbon black, a second binder including 1 part by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 18: Manufacture of Negative Electrode and Lithium Secondary Battery

First, a negative electrode active material including 9.33 parts by weight of natural graphite having an average sphericity of 0.95 and 83.97 parts by weight of artificial graphite having an average sphericity of 0.9, a conductive material including 1.5 parts by weight of carbon black, a first binder including 4.2 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.65 parts by weight of natural graphite having an average sphericity of 0.95 and 86.85 parts by weight of artificial graphite having an average sphericity of 0.9, a conductive material including 1.5 parts by weight of carbon black, a second binder including 1 part by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 19: Manufacture of Negative Electrode and Lithium Secondary Battery

First, a negative electrode active material including 9.33 parts by weight of natural graphite having an average sphericity of 0.95 and 83.97 parts by weight of artificial graphite having an average sphericity of 0.9, a conductive material including 1.5 parts by weight of carbon black, a first binder including 4.2 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.65 parts by weight of natural graphite having an average sphericity of 0.95 and 86.85 parts by weight of artificial graphite having an average sphericity of 0.9, a conductive material including 1.5 parts by weight of carbon black, a second binder including 1 part by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Example 20: Manufacture of Negative Electrode and Lithium Secondary Battery

First, a negative electrode active material including 9.45 parts by weight of natural graphite having an average sphericity of 0.95 and 85.05 parts by weight of artificial graphite having an average sphericity of 0.9, a conductive material including 1.5 parts by weight of carbon black, a first binder including 3 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.725 parts by weight of natural graphite having an average sphericity of 0.95 and 87.525 parts by weight of artificial graphite having an average sphericity of 0.9, a conductive material including 1.5 parts by weight of carbon black, a second binder including 0.25 parts by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Comparative Example 1: Manufacture of Negative Electrode and Lithium Secondary Battery First, a negative electrode active material including 9.52 parts by weight of natural graphite having an average sphericity of 0.95 and 85.68 parts by weight of artificial graphite having an average sphericity of 0.9, a conductive material including 1.5 parts by weight of carbon black, a binder including 2.3 parts by weight of styrene butadiene rubber (SBR) and 1 part by weight of carboxymethyl cellulose (CMC), and water as a dispersion medium were mixed to prepare a slurry having the solid content as shown in the following Table 1.

The slurry was coated on one surface of copper (Cu) foil (thickness: 10 μm) as a negative electrode current collector by using a slot die.

Then, a negative electrode, a positive electrode and a secondary battery were obtained in the same manner as Example 1, except that the content of the binder in the solid content of the slurry, loading amount, solid content of the slurry, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Comparative Example 2: Manufacture of Negative Electrode and Lithium Secondary Battery First, a negative electrode active material including 9.4 parts by weight of natural graphite having an average sphericity of 0.95 and 84.6 parts by weight of artificial graphite having an average sphericity of 0.9, a conductive material including 1.5 parts by weight of carbon black, a binder including 3.5 parts by weight of styrene butadiene rubber (SBR) and 1 part by weight of carboxymethyl cellulose (CMC), and water as a dispersion medium were mixed to prepare a slurry having the solid content as shown in the following Table 1.

The slurry was coated on one surface of copper (Cu) foil (thickness: 10 μm) as a negative electrode current collector by using a slot die.

Then, a negative electrode, a positive electrode and a secondary battery were obtained in the same manner as Example 1, except that the content of the binder in the solid content of the slurry, loading amount, solid content of the slurry, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Comparative Example 3: Manufacture of Negative Electrode and Lithium Secondary Battery First, a negative electrode active material including 9.52 parts by weight of natural graphite having an average sphericity of 0.95 and 85.68 parts by weight of artificial graphite having an average sphericity of 0.9, a conductive material including 1.5 parts by weight of carbon black, a binder including 2.3 parts by weight of styrene butadiene rubber (SBR) and 1 part by weight of carboxymethyl cellulose (CMC), and water as a dispersion medium were mixed to prepare a slurry having the solid content as shown in the following Table 1.

The slurry was coated on one surface of copper (Cu) foil (thickness: 10 μm) as a negative electrode current collector by using a slot die.

Then, a negative electrode, a positive electrode and a secondary battery were obtained in the same manner as Example 1, except that the content of the binder in the solid content of the slurry, loading amount, solid content of the slurry, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Comparative Example 4: Manufacture of Negative Electrode and Lithium Secondary Battery First, a negative electrode active material including 9.35 parts by weight of natural graphite having an average sphericity of 0.95 and 84.15 parts by weight of artificial graphite having an average sphericity of 0.9, a conductive material including 1.5 parts by weight of carbon black, a binder including 4 parts by weight of styrene butadiene rubber (SBR) and 1 part by weight of carboxymethyl cellulose (CMC), and water as a dispersion medium were mixed to prepare a slurry having the solid content as shown in the following Table 1.

The slurry was coated on one surface of copper (Cu) foil (thickness: 10 μm) as a negative electrode current collector by using a slot die.

Then, a negative electrode, a positive electrode and a secondary battery were obtained in the same manner as Example 1, except that the content of the binder in the solid content of the slurry, loading amount, solid content of the slurry, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Comparative Example 5: Manufacture of Negative Electrode and Lithium Secondary Battery First, a negative electrode active material including 9.45 parts by weight of natural graphite having an average sphericity of 0.95 and 85.05 parts by weight of artificial graphite having an average sphericity of 0.9, a conductive material including 1.5 parts by weight of carbon black, a first binder including 3 parts by weight of styrene butadiene rubber (SBR) and 1 part by weight of carboxymethyl cellulose (CMC), and water as a dispersion medium were mixed to prepare a slurry for a lower layer having the solid content as shown in the following Table 1.

In addition, a negative electrode active material including 9.74 parts by weight of natural graphite having an average sphericity of 0.95 and 87.66 parts by weight of artificial graphite having an average sphericity of 0.9, a conductive material including 1.5 parts by weight of carbon black, a second binder including 0.1 part by weight of styrene butadiene rubber (SBR) and 1 part by weight of carboxymethyl cellulose (CMC), and water as a dispersion medium were mixed to prepare a slurry for an upper layer having the solid content as shown in the following Table 1.

Then, a negative electrode, a positive electrode and a secondary battery were obtained in the same manner as Example 1, except that the slurry for a lower layer and the slurry for an upper layer prepared as described above were used; the content of the first binder in the solid content of the slurry for a lower layer, content of the second binder in the solid content of the slurry for an upper layer, loading amount, solid content of each of the slurry for a lower layer and slurry for an upper layer, slurry coating amount, total content of dispersion medium, coating rate, oven length, drying time and drying rate were set as shown in the following Table 1; and the hot air temperature condition of each of the first drying zone to the tenth drying zone of the drying system was set as shown in the following Table 2.

Determination of Adhesion of Negative Electrode

The adhesion of each of the negative electrodes according to Examples 1-20 and Comparative Examples 1-5 was determined. The results are shown in the following Table 1.

The method for determining the adhesion of each negative electrode is as follows.

Each of the negative electrodes was cut into a size of 20 mm×200 mm (width X length) to prepare a negative electrode sample. A double-sided adhesive tape was attached to a glass plate, and the negative electrode sample was attached thereto in such a manner that the active material layer surface of the negative electrode sample might be adhered to the adhesive tape. Then, the negative electrode sample was fixed firmly to the glass plate by pushing it with a 2 kg roller, while allowing the roller to reciprocate on the negative electrode sample 10 times. After that, the end portion of the negative electrode sample was mounted to a UTM instrument (LLOYD Instrument LF Plus), and force was applied at 90° and a rate of 300 mm/min. The force required for separating the active material layer from the current collector was measured. Herein, the test length was 5 cm, and the adhesion measurement data from the initial test to 1 cm of the test length of 5 cm were excluded, and the average of adhesion values measured over a test length of 1-5 cm was calculated and defined as the adhesion of the corresponding negative electrode.

TABLE 1

| | Coating process | Content of first binder in solid content of slurry for lower layer Wt % | Content of second binder in solid content of slurry for upper layer Wt % | Loading (each of upper layer and lower layer has the following loading amount) g/25 $cm^2$ | Solid content (each of slurry for lower layer and slurry for upper layer has the following solid content) % | Slurry coating amount g/25 $cm^2$ |
|---|---|---|---|---|---|---|
| Ex. 1 | Wet on wet | 4 | 3 | 0.387 | 0.47 | 0.823404 |
| Ex. 2 | Wet on wet | 4 | 2.6 | 0.387 | 0.47 | 0.823404 |
| Ex. 3 | Wet on wet | 4 | 2.6 | 0.387 | 0.47 | 0.823404 |
| Ex. 4 | Wet on wet | 4 | 2.6 | 0.387 | 0.47 | 0.823404 |
| Ex. 5 | Wet on wet | 4 | 2.6 | 0.387 | 0.47 | 0.823404 |
| Ex. 6 | Wet on wet | 4.6 | 2 | 0.387 | 0.47 | 0.823404 |
| Ex. 7 | Wet on wet | 4.6 | 2 | 0.387 | 0.47 | 0.823404 |
| Ex. 8 | Wet on wet | 4.6 | 2 | 0.387 | 0.47 | 0.823404 |
| Ex. 9 | Wet on wet | 5.1 | 1.5 | 0.387 | 0.47 | 0.823404 |
| Ex. 10 | Wet on wet | 5.1 | 1.5 | 0.387 | 0.47 | 0.823404 |
| Ex. 11 | Wet on wet | 4.9 | 2.3 | 0.387 | 0.47 | 0.823404 |
| Ex. 12 | Wet on wet | 4.9 | 2.3 | 0.387 | 0.47 | 0.823404 |
| Ex. 13 | Wet on wet | 4.9 | 2.3 | 0.387 | 0.47 | 0.823404 |
| Ex. 14 | Wet on wet | 5.2 | 2 | 0.387 | 0.47 | 0.823404 |

TABLE 1-continued

| | | | | | | |
|---|---|---|---|---|---|---|
| Ex. 15 | Wet on wet | 5.2 | 2 | 0.387 | 0.47 | 0.823404 |
| Ex. 16 | Wet on wet | 4.6 | 2 | 0.387 | 0.47 | 0.823404 |
| Ex. 17 | Wet on wet | 4.6 | 2 | 0.387 | 0.47 | 0.823404 |
| Ex. 18 | Wet on wet | 5.2 | 2 | 0.387 | 0.47 | 0.823404 |
| Ex. 19 | Wet on wet | 5.2 | 2 | 0.387 | 0.47 | 0.823404 |
| Ex. 20 | Wet on wet | 4 | 1.25 | 0.387 | 0.47 | 0.823404 |
| Comp. Ex. 1 | Wet (single) | 3.3 | — | 0.387 | 0.47 | 0.823404 |
| Comp. Ex. 2 | Wet (single) | 4.5 | — | 0.387 | 0.47 | 0.823404 |
| Comp. Ex. 3 | Wet (single) | 3.3 | — | 0.387 | 0.47 | 0.823404 |
| Comp. Ex. 4 | Wet (single) | 5 | — | 0.387 | 0.47 | 0.823404 |
| Comp. Ex. 5 | Wet on wet | 4 | 1.1 | 0.387 | 0.47 | 0.823404 |

| | Total content of dispersion medium $g/25\ cm^2$ | Coating rate m/min | Oven length m | Drying time (oven length/ coating rate) min | Drying rate per unit area ($cm^2$) $g/(cm^2 \times min)$ | Adhesion Gf/20 mm | Ratio (B) of wt % of binder in lower layer/wt % of binder in upper layer | B/ drying rate (A) |
|---|---|---|---|---|---|---|---|---|
| Ex. 1 | 0.436404 | 20 | 50 | 2.5 | 0.070 | 52.9 | 1.333333 | 191 |
| Ex. 2 | 0.436404 | 30 | 50 | 1.666667 | 0.0105 | 48.30 | 1.538462 | 147 |
| Ex. 3 | 0.436404 | 40 | 50 | 1.25 | 0.0140 | 37.70 | 1.538462 | 110 |
| Ex. 4 | 0.436404 | 30 | 60 | 2 | 0.0087 | 37.40 | 1.538462 | 176 |
| Ex. 5 | 0.436404 | 40 | 60 | 1.5 | 0.0116 | 25.76 | 1.538462 | 132 |
| Ex. 6 | 0.436404 | 40 | 60 | 1.5 | 0.0116 | 33.06 | 2.3 | 198 |
| Ex. 7 | 0.436404 | 50 | 60 | 1.2 | 0.0145 | 31.32 | 2.3 | 158 |
| Ex. 8 | 0.436404 | 60 | 60 | 1 | 0.0175 | 23.7 | 2.3 | 132 |
| Ex. 9 | 0.436404 | 40 | 60 | 1.5 | 0.0116 | 35.86 | 3.4 | 292 |
| Ex. 10 | 0.436404 | 50 | 60 | 1.2 | 0.0145 | 26.5 | 3.4 | 234 |
| Ex. 11 | 0.436404 | 45 | 60 | 1.333333 | 0.0131 | 30.735 | 2.130435 | 163 |
| Ex. 12 | 0.436404 | 50 | 60 | 1.2 | 0.0145 | 26.7675 | 2.130435 | 146 |
| Ex. 13 | 0.436404 | 60 | 60 | 1 | 0.0175 | 21.2267 | 2.130435 | 122 |
| Ex. 14 | 0.436404 | 50 | 60 | 1.2 | 0.0145 | 33.97 | 2.6 | 179 |
| Ex. 15 | 0.436404 | 60 | 60 | 1 | 0.0175 | 27.0092 | 2.6 | 149 |
| Ex. 16 | 0.436404 | 66 | 80 | 1.212121 | 0.0144 | 29.6092 | 2.3 | 160 |
| Ex. 17 | 0.436404 | 80 | 80 | 1 | 0.0175 | 24.8775 | 2.3 | 132 |
| Ex. 18 | 0.436404 | 66 | 80 | 1.212121 | 0.0144 | 31.925 | 2.6 | 181 |
| Ex. 19 | 0.436404 | 80 | 80 | 1 | 0.0175 | 25.4131 | 2.6 | 149 |
| Ex. 20 | 0.436404 | 40 | 50 | 1.25 | 0.014 | 24.3 | 3.2 | 229 |
| Comp. Ex. 1 | 0.436404 | 30 | 50 | 1.666667 | 0.0105 | 19.6 | 1 | 95 |
| Comp. Ex. 2 | 0.436404 | 30 | 50 | 1.666667 | 0.0105 | 24 | 1 | 95 |
| Comp. Ex. 3 | 0.436404 | 40 | 50 | 1.25 | 0.0140 | 11.2 | 1 | 72 |
| Comp. Ex. 4 | 0.436404 | 40 | 50 | 1.25 | 0.0140 | 22 | 1 | 72 |
| Comp. Ex. 5 | 0.436404 | 40 | 50 | 1.25 | 0.014 | 24.2 | 3.636364 | 260 |

In Table 1, each of the content (wt %) of the first binder in the slurry for a lower layer and the content (wt %) of the second binder in the slurry for an upper layer corresponds to the weight percentage of the first binder in the lower region and that of the second binder in the upper region of the finished negative electrode.

Referring to Table 1, it can be seen that, in the case of each of the negative electrodes satisfying a value of A (=B/(drying rate)) of 103-300 according to Examples 1-20 by controlling the drying rate of the slurry for forming a negative electrode active material layer depending on the ratio (B) of the content of the binder in the lower region based on the content of the binder in the upper region, the adhesion between the active material layer and the current collector is increased, even though the content (wt %) of the binder in the negative electrode active material layer (average value of the weight percentage of the first binder in the lower region and that of the second binder in the upper region) is equal to or smaller than the content (wt %) of the binder in each of the negative electrode active material layers according to Comparative Examples 1-5. It is thought that this is because migration of the binder toward the active material layer surface is inhibited and uniform distribution of the binder in the active material layer is realized by controlling the drying rate, after applying the slurry for an upper layer and slurry for a lower layer for forming a negative electrode active material layer, when manufacturing a negative electrode according to Examples.

TABLE 2

| | Hot air temperature (° C.) | | | | | | | | | |
|---|---|---|---|---|---|---|---|---|---|---|
| | First drying zone | Second drying zone | Third drying zone | Fourth drying zone | Fifth drying zone | Sixth drying zone | Seventh drying zone | Eighth drying zone | Ninth drying zone | Tenth drying zone |
| Ex. 1 | 130 | 110 | 70 | 70 | 70 | 70 | 70 | 70 | 60 | 50 |
| Ex. 2 | 130 | 110 | 80 | 80 | 80 | 80 | 90 | 90 | 90 | 50 |
| Ex. 3 | 140 | 130 | 90 | 90 | 90 | 100 | 100 | 100 | 90 | 50 |
| Ex. 4 | 130 | 110 | 70 | 70 | 80 | 80 | 80 | 80 | 90 | 50 |
| Ex. 5 | 140 | 120 | 90 | 90 | 90 | 90 | 90 | 90 | 90 | 50 |
| Ex. 6 | 140 | 120 | 90 | 90 | 90 | 90 | 90 | 90 | 90 | 50 |
| Ex. 7 | 140 | 130 | 100 | 100 | 100 | 100 | 100 | 100 | 90 | 50 |
| Ex. 8 | 140 | 130 | 120 | 120 | 120 | 120 | 120 | 120 | 90 | 50 |
| Ex. 9 | 140 | 120 | 90 | 90 | 90 | 90 | 90 | 90 | 90 | 50 |
| Ex. 10 | 140 | 130 | 100 | 100 | 100 | 100 | 100 | 100 | 90 | 50 |
| Ex. 11 | 140 | 130 | 90 | 90 | 100 | 100 | 100 | 100 | 90 | 50 |
| Ex. 12 | 140 | 130 | 100 | 100 | 100 | 100 | 100 | 100 | 90 | 50 |
| Ex. 13 | 140 | 130 | 120 | 120 | 120 | 120 | 120 | 120 | 90 | 50 |
| Ex. 14 | 140 | 130 | 100 | 100 | 100 | 100 | 100 | 100 | 90 | 50 |
| Ex. 15 | 140 | 130 | 120 | 120 | 120 | 120 | 120 | 120 | 90 | 50 |
| Ex. 16 | 140 | 130 | 100 | 100 | 100 | 100 | 100 | 100 | 90 | 50 |
| Ex. 17 | 140 | 130 | 120 | 120 | 120 | 120 | 120 | 120 | 90 | 50 |
| Ex. 18 | 140 | 130 | 90 | 100 | 100 | 100 | 100 | 100 | 90 | 50 |
| Ex. 19 | 140 | 130 | 120 | 120 | 120 | 120 | 120 | 120 | 90 | 50 |
| Ex. 20 | 140 | 130 | 90 | 90 | 90 | 100 | 100 | 100 | 90 | 50 |
| Comp. Ex. 1 | 130 | 110 | 80 | 80 | 80 | 80 | 90 | 90 | 90 | 50 |
| Comp. Ex. 2 | 130 | 110 | 80 | 80 | 80 | 80 | 90 | 90 | 90 | 50 |
| Comp. Ex. 3 | 140 | 130 | 90 | 90 | 90 | 100 | 100 | 100 | 90 | 50 |
| Comp. Ex. 4 | 140 | 130 | 100 | 100 | 100 | 100 | 100 | 100 | 90 | 50 |
| Comp. Ex. 5 | 140 | 130 | 90 | 90 | 90 | 100 | 100 | 100 | 90 | 50 |

Determination of Resistance of Negative Electrode

Each of the secondary batteries according to Examples 3, 9 and 14 and Comparative Example 1 (width×length=4×4 cm) was charged at 1 C in a constant current (CC)/constant voltage (CV) mode to 4.25 V at a room temperature of 25 °C, and the discharge resistance was calculated from the voltage after applying an electric current corresponding to 2.5 C for 30 seconds at a SOC (state-of-charge) of 50. The results are shown in the following Table 3.

TABLE 3

| | Resistance (mohm) | Ratio (B) of wt % of binder in lower layer/wt % of binder in upper layer | B/drying rate (A) |
|---|---|---|---|
| Ex. 3 | 1.485 | 1.538462 | 110 |
| Ex. 9 | 1.492 | 3.4 | 292 |
| Ex. 14 | 1.502 | 2.6 | 179 |
| Comp. Ex. 1 | 1.57 | 1 | 95 |

Referring to Table 3, it can be seen that each of the secondary batteries using the negative electrodes according to Examples 3, 9 and 14 shows significantly improved resistance characteristics, as compared to the secondary battery according to Comparative Example 1. Herein, even though the total binder content (average value of the first binder in the lower layer and the second binder in the upper layer) in the active material layer of each of Examples 3 and 9 is 3.3 wt %, which is the same as Comparative Example 1, and the total binder content in the active material of Example 14 is 3.6 wt %, which is larger as compared to Comparative Example 1, the secondary batteries according to Examples 3, 9 and 14 show better results in terms of resistance. It is thought that this is because the drying rate is controlled after coating the slurry for an upper layer and slurry for a lower layer, when manufacturing each of the negative electrodes according to Examples, which inhibits migration of the binder toward the active material layer surface, and thus the interfacial adhesion between the current collector and the negative electrode active material layer is improved and separation of the active material is prevented.

What is claimed is:

1. A method for manufacturing a negative electrode, comprising:

preparing a slurry for a lower layer containing a first active material, a first binder and a first dispersion medium, and a slurry for an upper layer containing a second active material, a second binder and a second dispersion medium;

coating the slurry for a lower layer on one surface of a negative electrode current collector, and coating the slurry for an upper layer on the slurry for a lower layer at the same time or with a predetermined time interval; and drying the slurry for a lower layer and the slurry for an upper layer after the coating at the same time to form an active material layer, wherein A is 103-300 and B is 1.1-3.5 in the following formula:

A=B/(drying rate),

B=(wt % of the first binder in a solid content of the slurry for a lower layer after the drying)/(wt % of the second binder in a solid content of the slurry for an upper layer after the drying), Drying rate =(a total content of the first and second dispersion medium per unit area of the active material layer)/(drying time) (g/($cm^2$×min)), wherein the slurry for a lower layer is coated on one surface of the negative electrode current collector, and the slurry for an upper layer is coated on the slurry for a lower layer at the same time or with a time interval of 0.6 sec or less.

2. The method for manufacturing a negative electrode according to claim 1, wherein A is 103-295.

3. The method for manufacturing a negative electrode according to claim 1, wherein B is 1.1-3.4.

4. The method for manufacturing a negative electrode according to claim 1, wherein a ratio of a thickness of an upper region of the active material layer derived from the slurry for an upper layer to a thickness of a lower region of the active material layer derived from the slurry for a lower layer is 1:1.04-1:9.

5. The method for manufacturing a negative electrode according to claim 1, wherein each of the first active material and the second active material independently comprises one chosen from artificial graphite, natural graphite, hard carbon, soft carbon, graphitized carbon fibers, graphitized mesocarbon microbeads, petroleum cokes, baked resin, carbon fibers, pyrolyzed carbon, Si, silicon oxide represented by $SiO_x$($0<x \leq 2$), lithium titanium oxide (LTO), lithium metal, and two or more mixture thereof.

6. The method for manufacturing a negative electrode according to claim 1, wherein each of the first binder and the second binder independently comprises one chosen from polyvinylidene fluoride-co-hexafluoropropylene (PVDF-co-HFP), polyvinylidene fluoride, polyacrylonitrile, polymethyl methacrylate, polyacrylic acid, polymethacrylic acid, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, styrene butadiene rubber (SBR), fluoro-rubber, and two or more mixture thereof.

7. The method for manufacturing a negative electrode according to claim 6, wherein each of the first binder and the second binder comprises styrene butadiene rubber (SBR) and carboxymethyl cellulose (CMC).

* * * * *